(12) United States Patent
Wang et al.

(10) Patent No.: US 12,345,736 B2
(45) Date of Patent: Jul. 1, 2025

(54) SYSTEMS AND METHODS FOR AUTOMATED TIP CONDITIONING FOR SCANNING TUNNELING SPECTROSCOPY

(71) Applicant: The Regents of the University of California, Oakland, CA (US)

(72) Inventors: Shenkai Wang, Oakland, CA (US); Junmian Zhu, Oakland, CA (US); Raymond Blackwell, Oakland, CA (US); Felix Fischer, Oakland, CA (US)

(73) Assignee: The Regents of the University of California, Oakland, CA (US)

( * ) Notice: Subject to any disclaimer, the term of this patent is extended or adjusted under 35 U.S.C. 154(b) by 402 days.

(21) Appl. No.: 18/084,300

(22) Filed: Dec. 19, 2022

(65) Prior Publication Data
US 2023/0194566 A1   Jun. 22, 2023

Related U.S. Application Data

(60) Provisional application No. 63/291,861, filed on Dec. 20, 2021.

(51) Int. Cl.
*G01Q 30/04* (2010.01)
*G01Q 10/06* (2010.01)
*G01Q 60/16* (2010.01)

(52) U.S. Cl.
CPC ............ *G01Q 30/04* (2013.01); *G01Q 10/06* (2013.01); *G01Q 60/16* (2013.01)

(58) Field of Classification Search
CPC ......... G01Q 30/04; G01Q 10/06; G01Q 60/16
See application file for complete search history.

(56) References Cited

U.S. PATENT DOCUMENTS

| | | | | |
|---|---|---|---|---|
| 2006/0100787 | A1* | 5/2006 | Berlin | G01Q 70/18 702/19 |
| 2011/0061139 | A1* | 3/2011 | Oral | G01Q 60/54 850/52 |
| 2015/0355226 | A1* | 12/2015 | Randall | G01Q 20/00 850/1 |
| 2018/0087102 | A1* | 3/2018 | Nagpal | C12Q 1/6869 |

* cited by examiner

*Primary Examiner* — Nicole M Ippolito
(74) *Attorney, Agent, or Firm* — Venable LLP; Henry J. Daley

(57) ABSTRACT

A scanning tunneling microscope including a z-axis scanning assembly; a quantum tunneling tip operatively connected to the z-axis scanning assembly; a z-axis controller configured to communicate with the z-axis scanning assembly; an x-y scanning assembly including a sample platform for holding a sample to be observed and arranged proximate the quantum tunneling tip separated in a z-axis direction from the platform; an x-y controller configured to communicate with the x-y scanning assembly; a measurement circuit connected to the quantum tunneling tip and the sample platform such that a relative electrical voltage is provided between said quantum tunneling tip and the sample platform and so as to measure an electrical current; and a data processor configured to communicate with the z-axis controller and the x-y controller to receive surface imaging information or point spectral information therefrom.

11 Claims, 11 Drawing Sheets

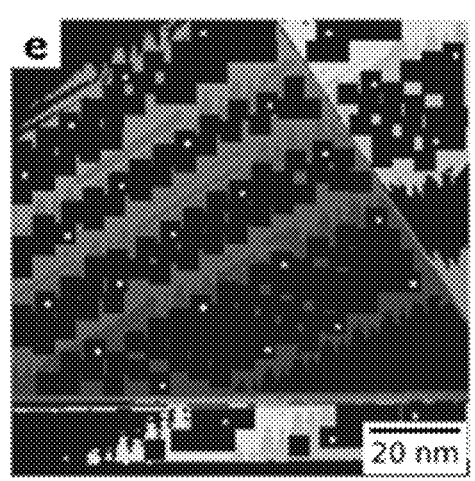
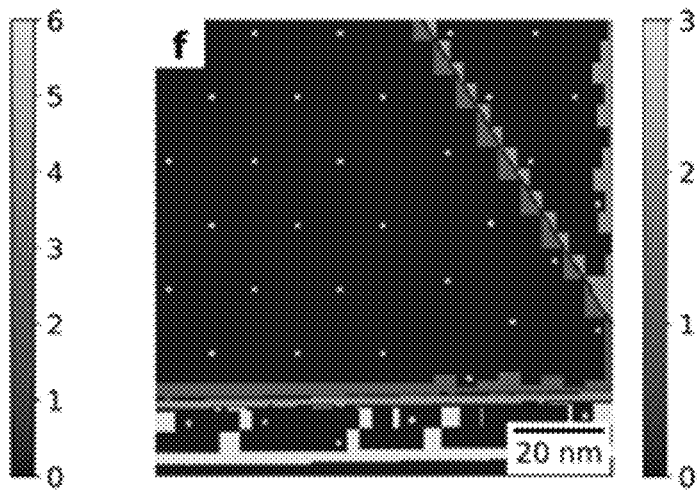
FIG. 3E
FIG. 3F
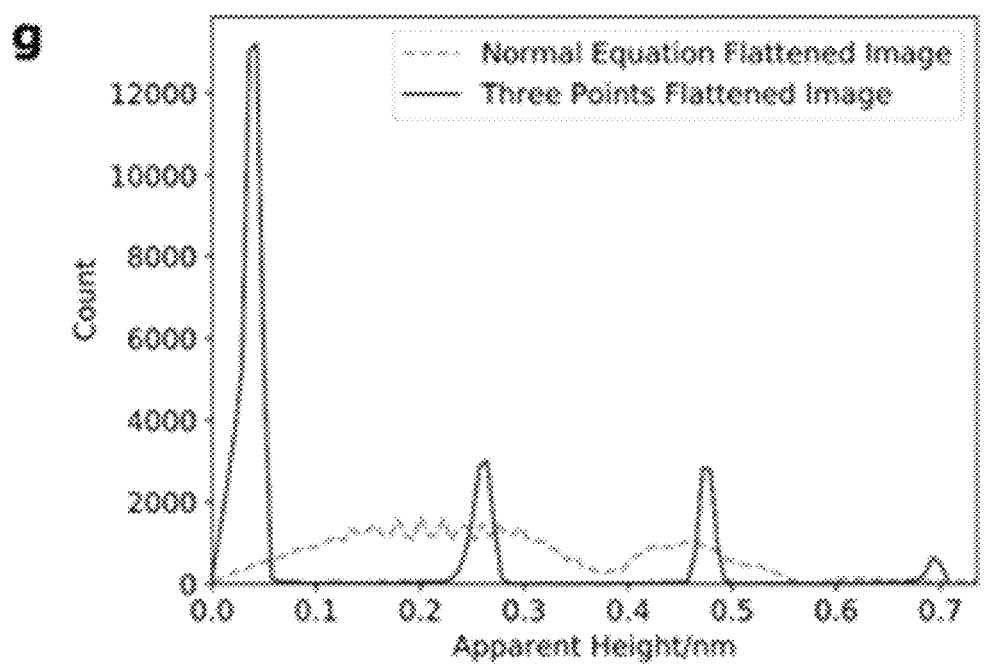
FIG. 3G

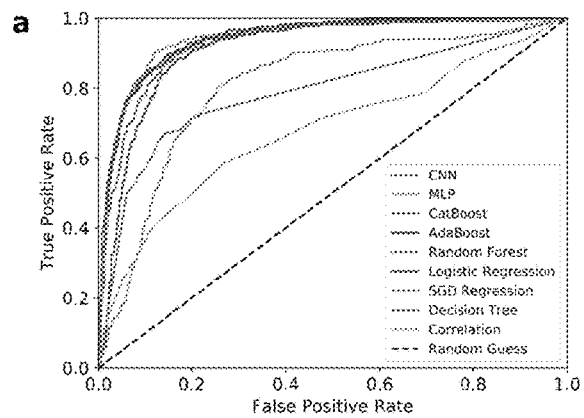
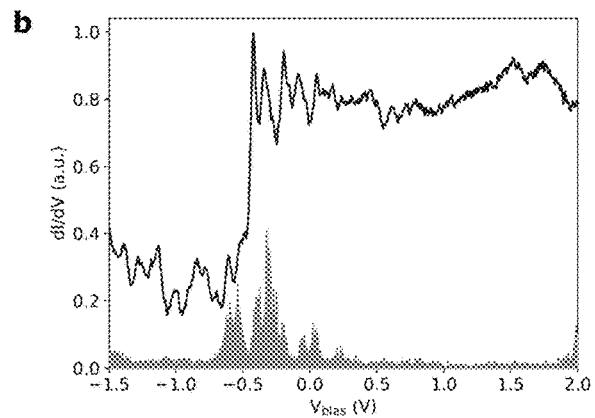
FIG. 5A
FIG. 5B
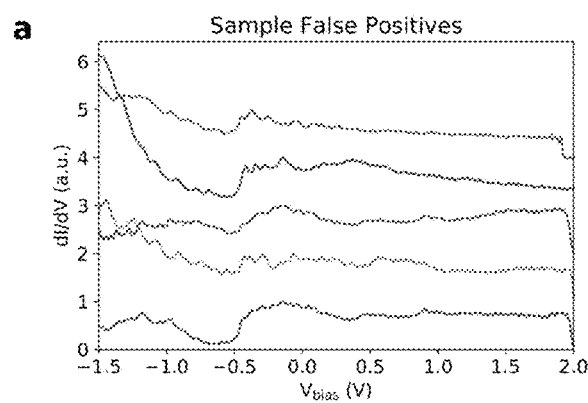
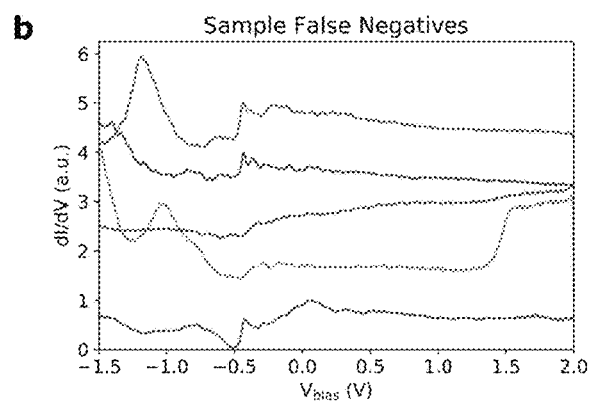
FIG. 6A
FIG. 6B

SYSTEMS AND METHODS FOR AUTOMATED TIP CONDITIONING FOR SCANNING TUNNELING SPECTROSCOPY

CROSS REFERENCE TO RELATED APPLICATIONS

The present patent application claims priority benefit to U.S. Provisional Patent Application No. 63/291,861, filed on Dec. 20, 2021, the entire contents of which is incorporated herein by reference.

GOVERNMENT LICENSE RIGHTS

This invention was made with government support under grant number 1807474 awarded by the National Science Foundation (NSF). The government has certain rights in the invention.

BACKGROUND

1. Technical Field

The field of currently claimed embodiments relate to scanning tunneling microscopes, and more particularly to systems and methods for automated tip conditioning for scanning tunneling spectroscopy.

2. Discussion of Related Art

Scanning tunneling microscopy (STM) techniques and associated scanning tunneling spectroscopic (STS) methods, such as dI/dV point spectroscopy, have been widely used to measure electronic structures and local density of states (LDOS) of molecules and materials with unprecedented spatial and energy resolutions. However, the quality of dI/dV spectra highly depends on the shape of the probe tips and atomically sharp tips with well-defined apex structures are required for obtaining reliable spectra. In most cases, STS measurements are performed in ultra-high vacuum (UHV) and low temperature (4 K) to minimize disturbances, while in advance tip preparation and constant in situ tip conditioning are required before and during the characterization of target molecules and materials. A common way to prepare an STM tip is to repetitively poke the tip on known and bare substrates, i.e., coinage metals or silicon, to remove contaminations and to potentially coat the tip with substrate atoms. The standard dI/dV spectra of the substrate will then be used as a reference to determine whether the tip is available for further experiments. Since the tip geometry change during the poking process is unpredictable, the tip conditioning is typically slow and needs to be constantly monitored. Therefore, it restricts the speed of high-quality STM spectroscopic studies.

Therefore, there remains a need for improved systems and methods for tip conditioning for scanning tunneling spectroscopy.

SUMMARY OF THE DISCLOSURE

An aspect of the present invention is to provide a scanning tunneling microscope. The scanning tunneling microscope includes a z-axis scanning assembly; a quantum tunneling tip operatively connected to the z-axis scanning assembly; a z-axis controller configured to communicate with the z-axis scanning assembly; an x-y scanning assembly including a sample platform having a surface for holding a sample to be observed and arranged proximate the quantum tunneling tip separated in a z-axis direction from the surface; an x-y controller configured to communicate with the x-y scanning assembly; a measurement circuit connected to the quantum tunneling tip and the sample platform such that a relative electrical voltage between the quantum tunneling tip and the sample platform can be provided during operation and such that an electrical current due to quantum mechanical tunneling from a sample held on the sample platform and the quantum tunneling tip can be measure, the measurement circuit being in communication with the z-axis controller to provide measurements of the electrical current; and a data processor configured to communicate with the z-axis controller and the x-y controller to receive one of surface imaging information or point spectral information therefrom. The data processor is further configured to provide instructions to the z-axis controller and the x-y controller for automatic conditioning of the quantum tunneling tip.

Another aspect of the present invention is to provide for automated tip conditioning for a scanning tunneling microscope. The method includes receiving by a computer one of surface imaging information or point spectral information from a quantum tunneling tip; locating by the computer a conditioning region within a scanning tunneling surface map for quantum tunneling tip conditioning; providing instructions by the computer to position the quantum tunneling tip over the conditioning region; providing instructions by the computer to move the quantum tunneling tip to come into contact and then retract from contact with the conditioning region; providing instructions by the computer to re-position the quantum tunneling tip over the conditioning region; providing instructions by the computer to perform scanning tunneling spectroscopy measurements; and providing instructions by the computer to compare the scanning tunneling spectroscopy measurements to a model to determine whether the quantum tunneling tip is in condition for use.

A further aspect of the present invention is to provide a computer-implemented method for automated tip conditioning for a scanning tunneling microscope. The method is implemented in a computer system including one or more processors configured to execute one or more computer program modules. The method includes receiving by the computer system one of surface imaging information or point spectral information from a quantum tunneling tip; locating by the computer system a conditioning region within a scanning tunneling surface map for quantum tunneling tip conditioning; providing instructions by the computer system to position the quantum tunneling tip over the conditioning region; providing instructions by the computer system to move the quantum tunneling tip to come into contact and then retract from contact with the conditioning region; providing instructions by the computer to re-position the quantum tunneling tip over the conditioning region; providing instructions by the computer system to perform scanning tunneling spectroscopy measurements; and providing instructions by the computer system to compare the scanning tunneling spectroscopy measurements to a model to determine whether the quantum tunneling tip is in condition for use.

BRIEF DESCRIPTION OF THE DRAWINGS

The present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention.

FIG. 3E shows the image of FIG. 3C showing tip conditioning positions detected by the program, according to an embodiment of the present invention;

FIG. 3F shows the image of FIG. 3D showing tip conditioning positions detected by the program, according to an embodiment of the present invention;

FIG. 3G is a histogram of pixel height for FIGS. 3A and 3B, according to an embodiment of the present invention;

FIG. 5A are Receiver Operating Characteristic (ROC) curves for machine learning models, according to an embodiment of the present invention;

FIG. 5B depicts a contribution of each data point on the classification of STS curves using a random forest model (feature importance), according to an embodiment of the present invention;

FIG. 6A shows sample dI/dV spectra in the test set that are classified as false positives (labeled as False, predicted as True), according to an embodiment of the present invention;

FIG. 6B shows sample dI/dV spectra in the test set that are classified as false negatives (labeled as True, predicted as False) by an AdaBoost model, according to an embodiment of the present invention;

DETAILED DESCRIPTION

Some embodiments of the current invention are discussed in detail below. In describing embodiments, specific terminology is employed for the sake of clarity. However, the invention is not intended to be limited to the specific terminology so selected. A person skilled in the relevant art will recognize that other equivalent components can be employed, and other methods developed without departing from the broad concepts of the present invention. All references cited anywhere in this specification are incorporated by reference as if each had been individually incorporated.

The term data processor is intended to refer to one of a localized or nonlocal, distributed apparatus. The data processor can be considered to be similar to, or in some cases identical to, a localized computer or a nonlocal, distributed computer system that includes a plurality of computers connected in a network. The computer, or plurality of computers, can included software to perform data processing task, and/or they can be hard-wired to perform the data processing tasks. The data processor can also be other hardware systems that can be configured either with software or hard wiring to perform the data processing tasks. The data processor can also have a plurality of substructures that can perform different tasks. For example, the data processor can have a substructure in some embodiments to provide instructions for the automatic conditioning of the quantum tunneling tip.

Figure 1:
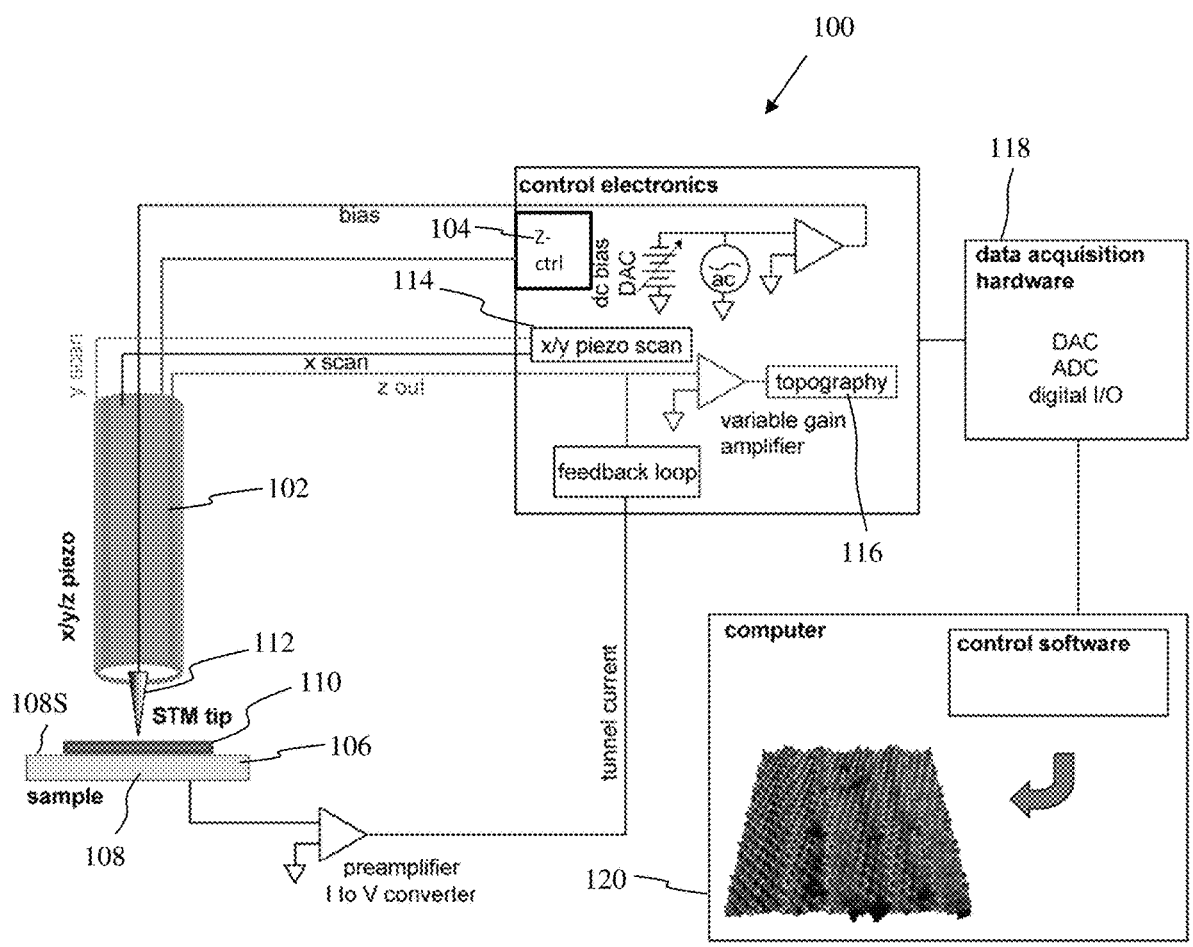
FIG. 1 is a schematic diagram of a scanning tunneling microscope, according to an embodiment of the current invention.

FIG. 1 is a schematic diagram of a scanning tunneling microscope 100, according to an embodiment of the current invention. The scanning tunneling microscope 100 includes a z-axis scanning assembly 102, a quantum tunneling tip 112 operatively connected to the z-axis scanning assembly 102, a z-axis controller 104 configured to communicate with the z-axis scanning assembly 102, an x-y scanning assembly 106 including a sample platform 108 having a surface 108S for holding a sample 110 to be observed and arranged proximate the quantum tunneling tip 112 separated in a z-axis direction from the surface 108S, an x-y controller 114 configured to communicate with the x-y scanning assembly 106, a measurement circuit 116 connected to the quantum tunneling tip 112 and the sample platform 108 such that a relative electrical voltage between the quantum tunneling tip 112 and the sample platform 108 can be provided during operation and such that an electrical current due to quantum mechanical tunneling from the sample 110 held on the sample platform 108 and the quantum tunneling tip 112 can be measured, the measurement circuit 116 being in communication with the z-axis controller 104 to provide measurements of the electrical current, and a data processor 118 configured to communicate with the z-axis controller 104 and the x-y controller 114 to receive one of surface imaging information or point spectral information therefrom. The data processor 118 is further configured to provide instructions to the z-axis controller 104 and the x-y controller 114 for automatic conditioning of the quantum tunneling tip.

In some embodiments, the data processor 118 can be further configured to automatically locate a conditioning region within a scanning tunneling surface map for quantum tunneling tip 112 conditioning. In further embodiments, the data processor 118 can be further configured to automatically provide instructions to the x-y controller 114 to position the quantum tunneling tip 112 over the conditioning region, to automatically provide instructions to the z-axis controller 104 to move the quantum tunneling tip 112 to come into contact and then retract from contact with the conditioning region, to automatically provide instructions to the x-y controller 114 to re-position the quantum tunneling tip 112 over the conditioning region, to provide instructions to the z-axis controller to perform scanning tunneling spectroscopy measurements, and to compare the scanning tunneling spectroscopy measurements to a model to determine whether the quantum tunneling tip 112 is in condition for use.

In some embodiments, the data processor 118 can be further configured to automatically repeat providing instructions to the x-y controller 114 to position the quantum tunneling tip 112 over the conditioning region, to automatically repeat providing instructions to the z-axis controller 104 to move the quantum tunneling tip to come into contact and then retract from contact with the conditioning region, to automatically repeat providing instructions to the x-y controller 114 to re-position the quantum tunneling tip 112 over the conditioning region, to automatically repeat providing instructions to the z-axis controller to perform scanning tunneling spectroscopy measurements, and to automatically repeat comparing the scanning tunneling spectroscopy measurements to a model until it automatically determines that the quantum tunneling tip is in condition for use.

In some embodiments the model can be a machine learning model resulting from training on a plurality of data sets.

Another embodiment of the current invention is directed to a method for automated tip conditioning for a scanning tunneling microscope. The method includes receiving by a computer 120 one of surface imaging information or point spectral information from a quantum tunneling tip 112, locating by the computer 120, a conditioning region within a scanning tunneling surface map for quantum tunneling tip conditioning, providing instructions by the computer 120 to position the quantum tunneling tip 112 over the conditioning region, providing instructions by the computer 120 to move the quantum tunneling tip 112 to come into contact and then retract from contact with the conditioning region, providing instructions by the computer to re-position the quantum tunneling tip over the conditioning region, providing instructions by the computer 120 to perform scanning tunneling spectroscopy measurements, and providing instructions by the computer 120 to compare the scanning tunneling spectroscopy measurements to a model to determine whether the quantum tunneling tip 112 is in condition for use.

In some embodiments the method above can be repeated a plurality of times until a stopping criterion is met.

Another embodiment of the current invention is directed to a data storage medium including a non-transient computer-executable code which when executed by the computer causes the computer to perform any of the methods noted above.

The following examples describe some concepts of the current invention in detail for particular embodiments. However, the general concepts of the current invention are not limited to these specific examples.

EXAMPLES: Scanning tunneling spectroscopy (STS), based on scanning tunneling microscopy (STM), is a powerful tool to characterize the electronic structure of single molecules and nanomaterials. While performing STS, the structure and condition of the probe tips are critical for obtaining reliable and stable spectra. Accordingly, an embodiment of the current invention is directed to an automated program based on machine learning models that can identify the Au(111) Shockley surface state from dI/dV spectra and perform tip conditioning on clean or sparsely covered gold surfaces with little user intervention. In an embodiment, we employ a straightforward height-based segmentation algorithm to analyze STM topographic images and identify tip conditioning positions and used 1789 archived dI/dV spectra to train machine learning models that can predict the condition of the tip by evaluating the quality of the spectroscopy data. Decision tree based ensemble and boosting models and deep neural networks (DNNs) have been proven to perform reasonably on identifying tips in usable conditions for STS. We expect the program to save human labor, reduce research costs for surface science studies and accelerate the discovery of novel nanomaterials by STM. The strategies presented in these examples can also be generalized for STM tip conditioning on other metallic surfaces.

In order to make efficient use of the idle time of the instrument and minimize the research time wasted on tip conditioning, we developed a program based on Python and machine learning that can automate the time-consuming tip conditioning processes according to an embodiment of the current invention. The program in one example is designed to do tip conditioning on Au(111) surfaces that are clean or with low molecular coverage with little human intervention. By just one click, the program is capable of continuing poking until the tip can generate near-publication quality spectroscopic data on gold surfaces (see supporting information for the user interface). It can control the operation of a Scienta Omicron STM and automatically analyze the collected topographic images to find bare Au areas that are large enough for tip conditioning. It will then collect dI/dV spectra at selected positions and use machine learning models to determine their quality compared to standard dI/dV spectra for Au[20] and see if the tip is good enough for further STS measurements. If the tip condition is not ideal, the program will control the STM to poke at the identified good positions until the machine learning model predicts the tip to be a good one. We used 1789 previously collected dI/dV spectra in our group to train machine learning models and to evaluate their performances. Decision tree based ensemble and boosting models (e.g. Random Forest, AdaBoost,[21] and CatBoost[22]) and deep neural networks (DNNs) are shown to have reasonable performances on identifying tips that are in usable (but may not be perfect) conditions where clear Au(111) Shockley surface states (gold surface states) are visible in the spectra. High-quality dI/dV spectra obtained from experiments are rare and far from enough to generate a sufficiently large training set to train a DNN. Therefore, data augmentation strategies for generating artificial dI/dV spectra using experimental spectra can be used in the future to solve the data availability issue. Furthermore, the data processing strategies presented here are generally applicable for automatic STM tip conditioning on other surfaces generally used in STM experiments.

Figure 2A:
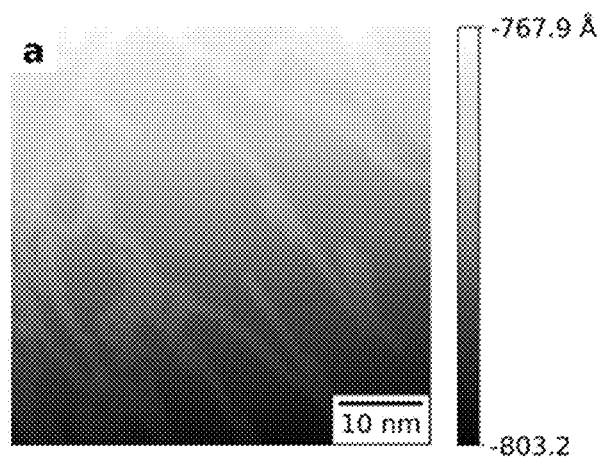
FIG. 2A shows a raw STM image of graphene nanoribbons on Au(111), according to an embodiment of the present invention.
Figure 2B:
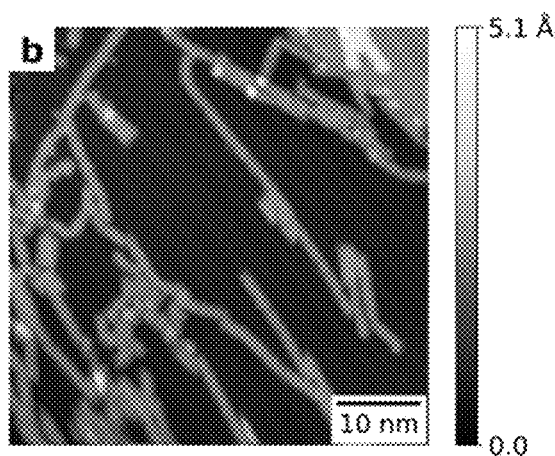
FIG. 2B shows the image of FIG. 2A flattened using normal equation, according to an embodiment of the present invention.
Figure 2C:
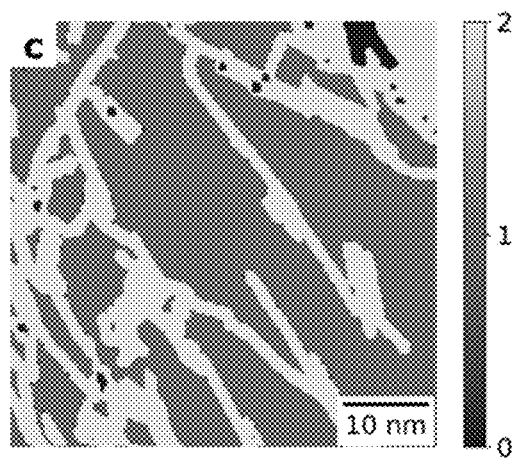
FIG. 2C shows the image of FIG. 2B segmented and labeled based on apparent height, according to an embodiment of the present invention.
Figure 2D:
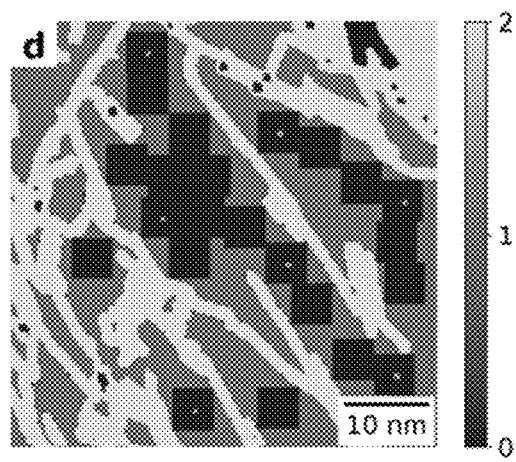
FIG. 2D shows the same segmented image of FIG. 2C showing tip conditioning positions detected by the program, according to an embodiment of the present invention.
Figure 2E:
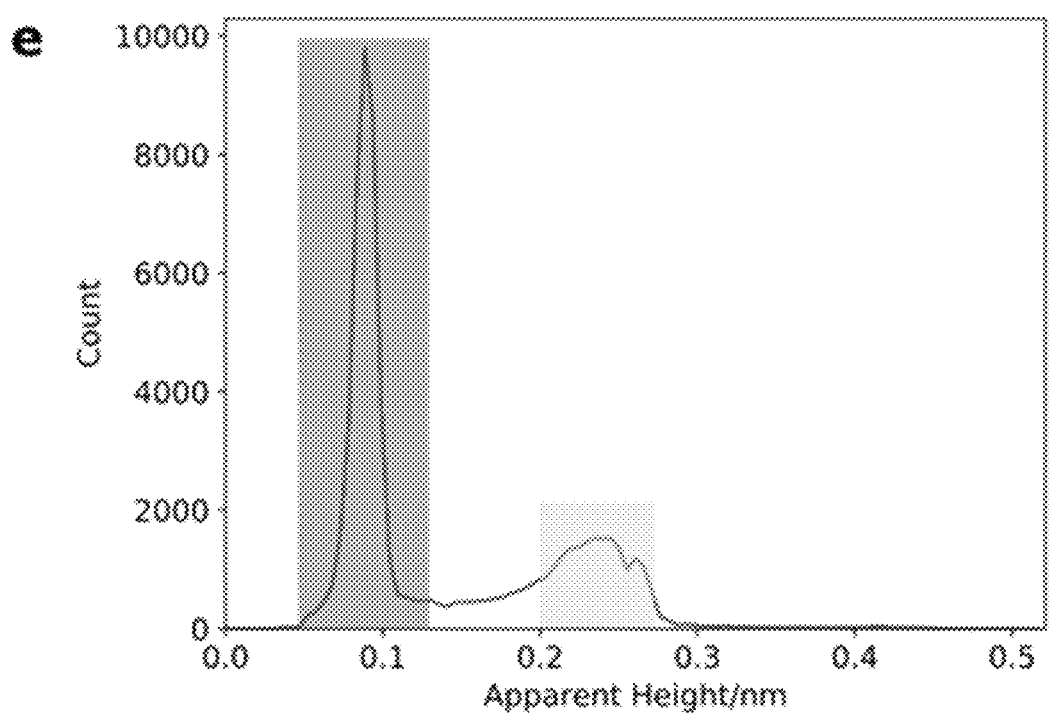
FIG. 2E is a histogram of pixel heights of the image shown in FIG. 2B, according to an embodiment of the present invention.

Locating tip conditioning positions in topographic images: FIG. 2A shows a raw STM image of graphene nanoribbons on Au(111), according to an embodiment of the present invention. FIG. 2B shows the image of FIG. 2A flattened using normal equation, according to an embodiment of the present invention. FIG. 2C shows the image of FIG. 2B segmented and labeled based on apparent height, according to an embodiment of the present invention. FIG. 2D shows the same segmented image of FIG. 2C showing tip conditioning positions detected by the program, according to an embodiment of the present invention. Green dots highlight positions where tip conditioning cycles are performed. FIG. 2E is a histogram of pixel heights of the image shown in FIG. 2B, according to an embodiment of the present invention. The highlighted regions represent −0.05 nm to +0.05 nm range centered around each peak. FIG. 2C is labeled based on the highlighted regions.

In order for the program to perform tip conditioning automatically in an embodiment, it is able to find out where to poke the tip and take dI/dV spectra. Therefore, an algorithm that can process STM topographic images and identify large enough clean substrate areas is used for our program. Programs aiming to automate topographic image analyzations and STM operations have been reported before, but most of these algorithms, some associated with machine learning methods, are designed for more complicated purposes such as atom manipulation. In an embodiment of our program, we employ a fast and straightforward method that segments topographic images based on apparent height and scans the labeled images with a 5 nm by 5 nm window to locate possible substrate areas for tip conditioning. The image processing procedure can be visualized as in FIGS. 2A-2D. The images in FIGS. 2A-2D were collected on an Au(111) substrate with graphene nanoribbons (GNRs) on it. Raw topographic images collected by STM are normally tilted, as shown in FIG. 2A, since STM tips are generally not perfectly perpendicular to the sample. Therefore, the first step of image processing is to calculate the best fit plane of the image using normal equation, a commonly used method in linear algebra, and subtract the plane from the raw image. The normal equation flattened image of FIG. 2A is shown as FIG. 2B. The program will then analyze the apparent height distribution of the flattened image, visualized as histogram in FIG. 2E, and identify peaks that denote the most prevalent heights. The flattened image can thus be segmented based on apparent height and labeled by the sequence of peaks in the histogram, as shown in FIG. 2C and highlighted in FIG. 2E. For our GNRs/Au(111) systems or for clean Au(111) surfaces, we group pixels within −0.05 nm to +0.05 nm of each prevalent height together and label them as the same number (FIG. 2E). For pixels that are not included in any group, we label them 0. This range can be adjusted based on the height variances of different systems. After labeling the topographic images, the program will use a 5 nm by 5 nm window to scan the image line by line and register areas that contain the same non-zero label (FIG. 2D). The middle of each registered square is considered as a good location to poke or take dI/dV spectra so in this case the poke and STS won't be performed over molecules or step edges. In each tip conditioning cycle, the program will control the STM to take two consecutive dI/dV spectra at a good location and use a machine learning model (discussed below) to analyze the second spectra. If the machine learning model predicts that the tip is not in an ideal condition, the program will control the STM to perform a 2 nm poke at the same location and move to the next cycle. Tip conditioning cycles are performed at good positions that are separated by at least 15 nm to avoid poking or doing STS over unknown particles dropped on the surface during previous cycles. In the example case in FIGS. 2A-2D, the tip conditioning cycles are performed at locations marked by small green dots in FIG. 2D. The 5 nm window and 15 nm separations are determined based on experience and can be adjusted according to systems. We use a machine learning model to analyze the second spectra in each tip conditioning cycle since the tip condition tend to change during the STS measurement right after a poke. The cycle is designed to be conservative to avoid potential damage to the tip and can be adjusted based on user preference.

Figure 3A:
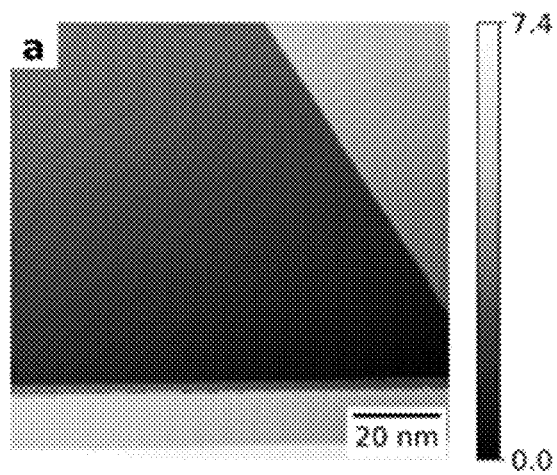
FIG. 3A shows a STM image of Au(111) surface flattened using normal equation, according to an embodiment of the present invention.
Figure 3B:
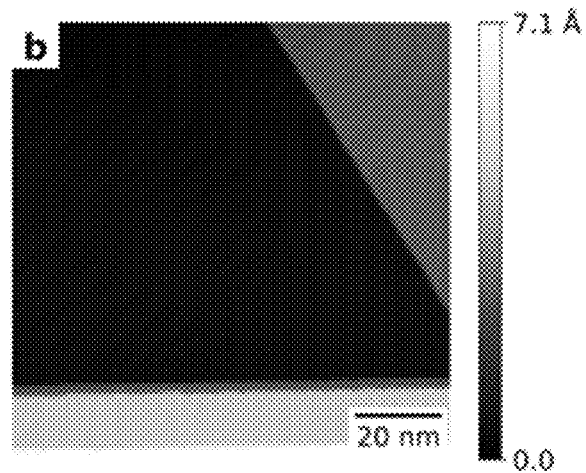
FIG. 3B shows the image of FIG. 3A flattened using three points alignment, according to an embodiment of the present invention.
Figure 3C:
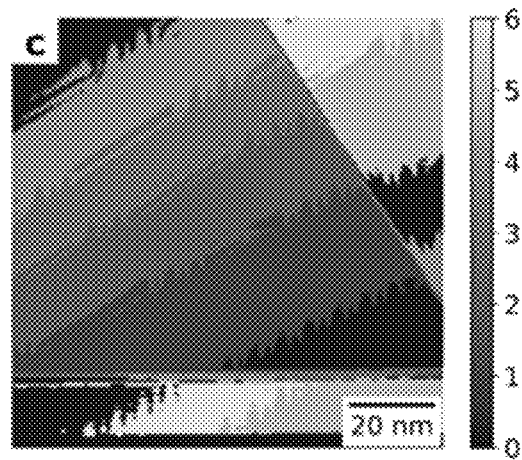
FIG. 3C shows the image of FIG. 3A segmented and labeled based on apparent height, according to an embodiment of the present invention.
Figure 3D:
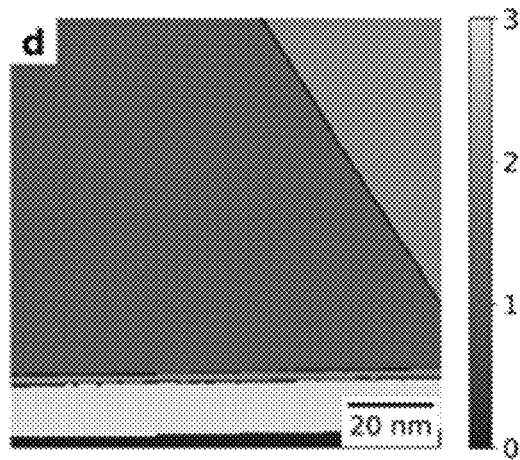
FIG. 3D shows the image of FIG. 3B segmented and labeled based on apparent height, according to an embodiment of the present invention.

FIG. 3A shows a STM image of Au(111) surface flattened using normal equation, according to an embodiment of the present invention. FIG. 3B shows the image of FIG. 3A flattened using three points alignment, according to an embodiment of the present invention. FIG. 3C shows the image of FIG. 3A segmented and labeled based on apparent height, according to an embodiment of the present invention. FIG. 3D shows the image of FIG. 3B segmented and labeled based on apparent height, according to an embodiment of the present invention. FIG. 3E shows the image of FIG. 3C showing tip conditioning positions detected by the program, according to an embodiment of the present invention. FIG. 3F shows the image of FIG. 3D showing tip conditioning positions detected by the program, according to an embodiment of the present invention. FIG. 3G is a histogram of pixel height for FIGS. 3A and 3B, according to an embodiment of the present invention.

Flattening topographic images with normal equation will not completely level the image if molecules on the surface are not evenly distributed or if step edges present in the image. To deal with such cases, STM users normally choose three points in the image that are supposed to have the same height to define a new best fit plane for image flattening. In an embodiment of our program, we incorporate a function that can perform three points flattening automatically. After the program registers all the good positions using the method mentioned above, it will find the central coordinates of three most separated squares in the label 1 region. The average height within each of the three squares in the topographic image is associated with the corresponding central coordinate and used to calculate the new best fit plane. To demonstrate the performance of automatic three points flattening, we present an example in FIGS. 3A-3G. FIGS. 3A, 3C and 3E show the results of an STM image flattened by normal equation and labeled using the methods demonstrated in FIGS. 2A-2E. FIG. 3B shows the three points flattened result of FIG. 3A. The height distributions of FIGS. 3A and 3B are presented in FIG. 3G, from which we can see that the three points flattening method levels the image decently compared to the normal equation method. The segmentation and labeling algorithm performs better on three points flattened images, as demonstrated in FIGS. 3D and 3F. However, we notice that the number of tip conditioning positions identified by the program are comparable in FIGS. 3D and 3F. Therefore, the three points flattening method does not facilitate the performance of our program too much, but we do expect this method to be useful in automatic programs for other purposes. In the cases that the program cannot find three squares in the label 1 region of normal equation flattened image, the program will move on and use the normal equation flattened image for tip conditioning. This will not compromise the efficiency of our program too much, since the purpose of the program is to make efficient use the idle time of the STM rather than trying to find every single tip conditioning position in the image.

Figure 4:
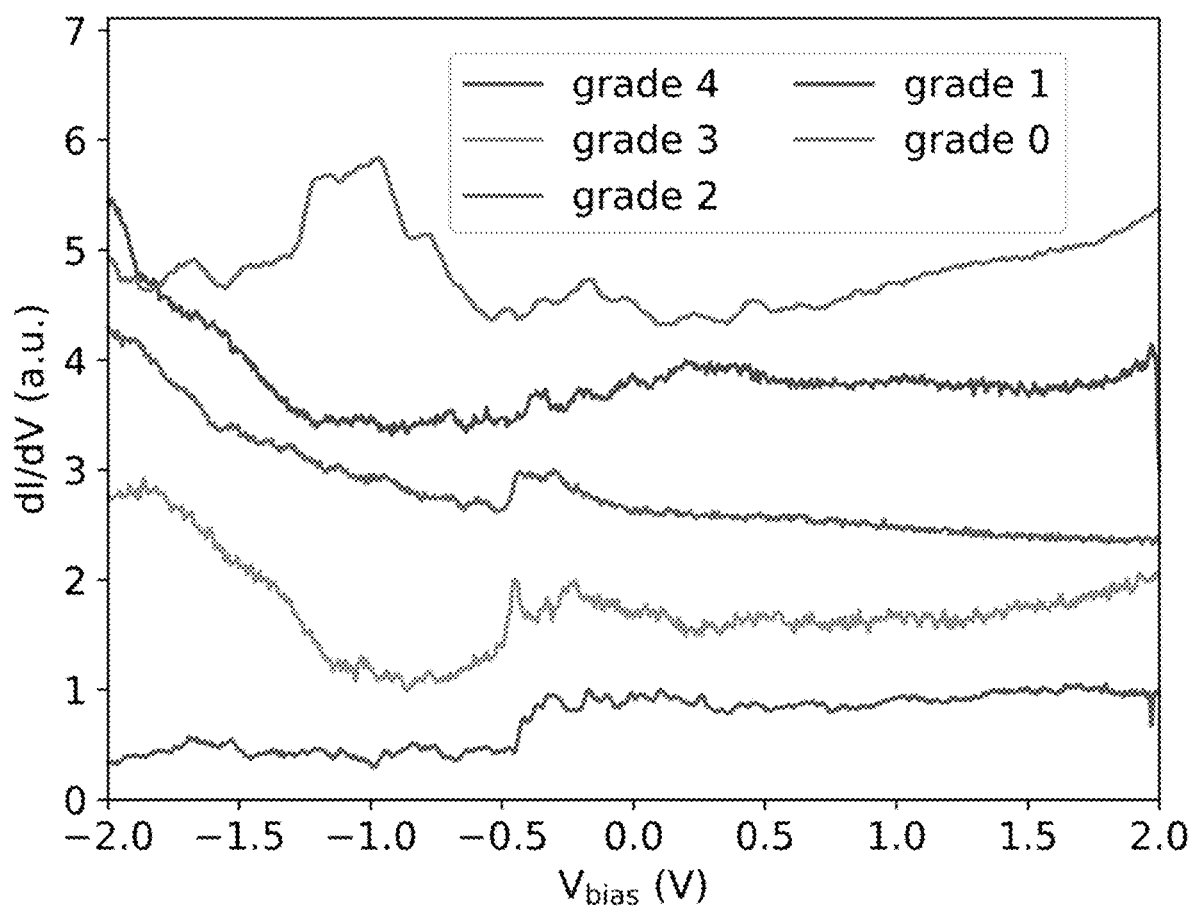
FIG. 4 are example STS curves with different grades, according to an embodiment of the present invention.

Evaluating tip condition from dI/dV spectra using machine learning models. FIG. 4 are example STS curves with different grades, according to an embodiment of the present invention. For the tip conditioning program to be useful for researchers, it needs to be able to stop when the tip is in a good shape for STS measurement. The program is designed to work on clean or sparsely covered Au(111) surfaces, so the quality of dI/dV spectra taken on gold can be used as an indicator for the condition of the tip. However, although it's clear to human eyes what a clean STS curve for gold is, there is no strict criteria on that for us the hard code into the program. Therefore, we apply machine learning models trained with archived gold dI/dV spectra to analyze spectra collected during tip conditioning. We manually labeled archived spectra based on their quality and resemblance to standard dI/dV spectra for gold. Each dI/dV spectrum is graded between 0 to 4, with 4 corresponding to the most decent curves and 0 to curves without gold surface states and have large unknown peaks. Sample dI/dV spectra with different grades are presented in FIG. 4. Spectra with clear gold surface states are graded between 2 to 4 while spectra without gold surface states are graded as 0 or 1. The number of dI/dV spectra with different grades are listed in Table 1. Since we don't have many spectra with grade 3 and 4 for training, we group dI/dV spectra with grade 2, 3, and 4 together and train them against spectra with grade 0 and 1 to obtain models that can differentiate gold surface states.

Table 1 provides a number of dI/dV spectra with different grade. Spectra with clear gold surface states are graded between 2 to 4.

TABLE 1

| Grade | 0(Bad) | 1 | 2(OK) | 3 | 4(Good) | Total |
|---|---|---|---|---|---|---|
| Training Label (Au Surface State?) | False | | | True | | |
| Number | 410 | 955 | 334 | 84 | 6 | 1789 |

Before training machine learning models, we scaled the STS data by normalizing the maximum dI/dV value between −0.75 V and 0 V on each curve to 1, so that the relative intensity of the gold surface state can be inherited during the normalization. We notice that −1.5 V to 2 V is the most important bias window in general STS measurements, so on each dI/dV spectrum we pick dI/dV values at 896 evenly spaced biases between −1.5 V to 2 V and generate a new curve for machine learning training and prediction. We used 80% of the data (1094 labeled False and 338 labeled True) for training and 20% of the data (271 labeled False and 86 labeled True) for testing. To evaluate the performance of different models, we compared their precision scores and recall scores acquired on the test set and their Receiver Operating Characteristic (ROC) Curves generated from three-fold cross-validation data on training set.[29] We also used a simple correlation method that doesn't rely on machine learning to benchmark the performance of our machine learning models. This correlation method classifies the spectra in our data set based on their mean squared error with respect to a good reference dI/dV spectrum (see supporting information for details). The evaluation results are presented in Table 2 and ROC curves are presented in FIG. 5A. FIG. 5A are Receiver Operating Characteristic (ROC) curves for machine learning models, according to an embodiment of the present invention. The curves are generated from classification probability results of three-fold cross-validation on the training set (except for the correlation curve, see supporting information). FIG. 5B depicts a contribution of each data point on the classification of STS curves using a random forest model (feature importance), according to an embodiment of the present invention. An STS curve with grade 4 is presented as reference. Table 2 provides a performance of different machine learning models on differentiating STS curves with gold surface states.

TABLE 2

| Model | Precision (On test set) | Recall (On test set) | ROC Area Under Curve |
|---|---|---|---|
| Correlation | 0.408 | 0.529 | 0.679 |
| SGD | 0.595 | 0.547 | 0.807 |
| SVM | 0.685 | 0.733 | N/A** |
| Logistic Regression | 0.587 | 0.628 | 0.913 |
| Decision Tree | 0.746 | 0.616 | 0.790 |
| Random Forest | 0.825 | 0.605 | 0.928 |
| AdaBoost | 0.829 | 0.674 | 0.942 |
| CatBoost | 0.842 | 0.744 | 0.943 |
| MLP | 0.792 | 0.663 | 0.940 |
| CNN | 0.806 | 0.674 | 0.935 |

In Table 2, SGD, SVM, MLP, and CNN denote stochastic gradient descent, support vector machine, multilayer perceptron, and convolutional neural network, respectively. AdaBoost and CatBoost are boosting methods based on decision tree. Correlation represents a basic model that does not rely on machine learning (see text). See supporting information for model details. SVM is generally not used to predict the probability of classification so a ROC curve is not applicable for SVM.

From Table 2 and FIG. 5A, we can see that the correlation method, regression methods, and several basic machine learning methods can in general differentiate good STS curves from bad ones but their classification results are not as good as decision tree based ensemble and boosting models and deep neural networks (MLP, CNN). FIG. 5B shows the weight of each data point in the STS curve on making the classification decision if a random forest model is applied. We notice that the model performs classification mainly based on data points between −0.75 V to 0 V, which matches the gold surface state region. This suggests that machine learning models can indeed learn to differentiate gold surface state based on our labeling.

The performance of machine learning models listed in Table 2 does not look appealing judged just by the precision and recall scores. However, this can be due to the inconsistency of manual labeling since there is no hard criteria for grading the dI/dV spectra. The differences between spectra with different grades are minor, especially for spectra that are graded as 1 or 2. Therefore, ambiguity in manual classification introduces significant noises into the dataset labeling. The lack of good spectra for training is another reason for the compromised performances. Deep neural networks tend to overfit our sample despite the simple architectures (see supporting information) we used. Furthermore, for the machine learning models to work we have to group spectra with grade 2, 3, and 4 together and label them as good. Therefore, some poor-quality spectra with visible gold surface state might have been labeled as grade 2 and used as good spectra for training.

FIG. 6A shows sample dI/dV spectra in the test set that are classified as false positives (labeled as False, predicted as True), according to an embodiment of the present invention. FIG. 6B shows sample dI/dV spectra in the test set that are classified as false negatives (labeled as True, predicted as False) by an AdaBoost model, according to an embodiment of the present invention. In order to better understand the performance of machine learning models, we provided in FIGS. 6A and 6B some of the dI/dV spectra in the test set that are predicted as false positives and false negatives by an AdaBoost model. We can see from FIG. 6A that the spectra that are predicted as false positives are not completely terrible, and if the tip conditioning program stops when it obtains one of these spectra, researchers may only need to do a few more mild tip conditioning operations before making serious measurements. On the other hand, the false negative spectra presented in FIG. 6B are not ideal gold spectra and represent tips that are in bad conditions. These false negative spectra may have been graded as 2 and labeled as True for training. Therefore, we are satisfied with the performances of our AdaBoost, CatBoost models and deep neural networks on identifying STM tips that are in reasonable conditions for STS measurements.

Since CatBoost models are only compatible with 64-bit systems and deep neural networks require more complex environments to deploy (with only margin boost on performances), we highly recommend the application of our AdaBoost model and will use it as the default model for our tip conditioning program. We have deployed the program on the Scienta Omicron STM and repeated tests showed that it takes in general 2 to 5 hours before the program classified the tip as in a good condition and stop. Since the program will only stop after the tip has been classified as good in two consecutive tip conditioning cycles (four dI/dV spectra taken, discussed previously in the paper), the state of the tip at that point is stable and will not change drastically if we do more 2 nm pokes. Therefore, in the cases when dI/dV spectra is not flawless when the program stops, after several manual tip conditioning operations we always managed to improve the tip to a usable state. Thus, we do expect that our tip conditioning program can make efficient use of the idle time of the STM and significantly reduce the amount of research time wasted on tip conditioning for STS measurements.

Possible improvements for machine learning models. With our current machine learning models, the program may stop at a dI/dV spectrum that has clear gold surface state but is not entirely flat in −1.5 V to −0.5 V region or −0.5 V to 2 V region (e.g. red line in FIG. 6A). This is because that some compromised grade 2 spectra are treated as good samples for training. In order to obtain machine learning models that can differentiate better dI/dV spectra from undermined ones, we need more grade 3 and 4 spectra that can be split into valid training and test sets. With more data collected in our lab, we will eventually have enough good spectra to achieve that goal, but a method to generate artificial spectra can be really useful in this case. We have in total 90 grade 3 and 4 spectra (Table 1) and the goal is to create artificial spectra based on it. We first created 1000 artificial spectra through linear combination of 25 randomly selected good spectra. The randomly generated weights of the 25 spectra are Dirichlet distributed and sum to 1. We use these 1000 artificial spectra as good spectra and real spectra with grade 0, 1, and 2 as bad ones to train deep neural networks (training/test split ratio 80/20). However, although the precision scores are higher than 97% and recall scores are higher than 99% on the test set for both MLP and CNN models, when we use these models to predict the 90 real good spectra, only 20 spectra are classified as good. This indicates that in this case deep neural networks do classification based on the artificial features introduced during the creation of the spectra. Regularization methods can be used to avoid overfitting so that 60 out of 90 real spectra can be classified as good, but the precision score will decrease to 70% and a lot of bad spectra will also be classified as good. Other data augment strategies and advanced machine learning methods needs to be considered in the future to improve our models.

However, even if we obtain a model that can differentiate grade 3 and 4 spectra from grade 0, 1, and 2 ones, if we apply that model to our tip conditioning program, it may take up to days before the program can stop due to the strict requirement. This fact will contradict our initial purpose of the program to make use of the idle time of the STM. Therefore, we are satisfied with the performance of our AdaBoost model and expect it to be the most useful one for our program and for other autonomous STM programs.

Conclusions and prospects: In these examples, we present an automated tip conditioning program for STS measurements based on Python and machine learning. We developed a straightforward algorithm to process and analyze topographic STM images in order to find possible tip conditioning positions on clean or sparsely covered gold surfaces. For each tip conditioning cycle, we collect two consecutive dI/dV spectra at an automatically identified tip conditioning position and use a machine learning model to see if the second spectrum is an acceptable dI/dV spectrum for Au(111). If the tip is not ideal the program will control the STM to perform a poke at the same location and move to the next cycle. Machine learning models are trained on archived dI/dV spectra for Au labeled based on their quality. Decision tree-based ensemble and boosting models and deep neural networks have similar performances on identifying usable tips with clear gold surface state and an AdaBoost model is used as default for the program to be robust, adaptable, and fast. Our program is designed for a Scienta Omicron STM but the method to process topographic images and the machine learning models can be easily transplanted to other STM platforms or programs for other STM atomization purposes. We expect that our program can make efficient use of the idle time of the STM (e.g., during the night) and greatly reduce the amount of research time wasted on tip conditioning for STS measurements. A user interface is presented in supporting information so that users can start or stop the program with just one click. Right now, the poke depth for tip conditioning is set to 2 nm to avoid drastic damage to the tip. In the future, however, we expect to embed reinforcement learning into our program so that the program may be able to figure out the best poking protocol for tip conditioning.

Experimental Methods: All topographic images and dI/dV spectra were collected using a Scienta Omicron STM under ultrahigh vacuum at 4.2 K. The tips were either electrochemically etched from polycrystalline tungsten wire or manually cut from Pt/Ir (80/20) wire using a wire cutter. No significant difference in the quality of images or spectra were observed between the two types of tips. Tips were manually conditioned for imaging and then automatically conditioned by the program for STS measurements.

Images and spectra presented in this paper were collected on Au(111) on mica substrates. The structure of molecules on the surfaces are not important for the results presented in this paper. Images and spectra were normally collected at a tunneling set point of $V_{bias}$=0.05 V, $I_t$=20 pA. Spectra were collected using a lock-in amplifier (Stanford Research Systems Inc., Model SR830) with a modulation frequency of 455 Hz and a modulation amplitude of 10 mV.

The operations of STM were controlled by an Omicron Matrix console and accessed by Python through the Remote-Access_API provided by Omicron. Machine learning models were implemented using the Scikit-Learn (0.22.1) module of Python and Keras (2.2.4) with TensorFlow backend.

Figure 7:
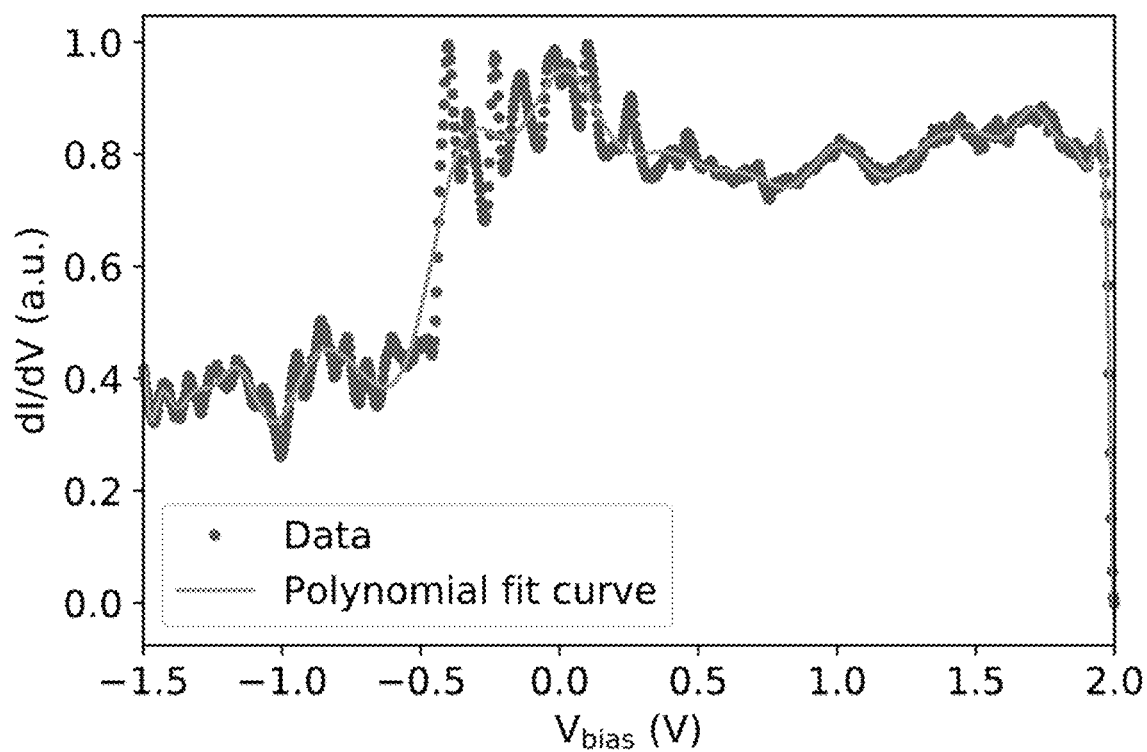
FIG. 7 shows a 40 degrees polynomial fit curve of a good dI/dV spectrum, according to an embodiment of the present invention.
Figure 8:
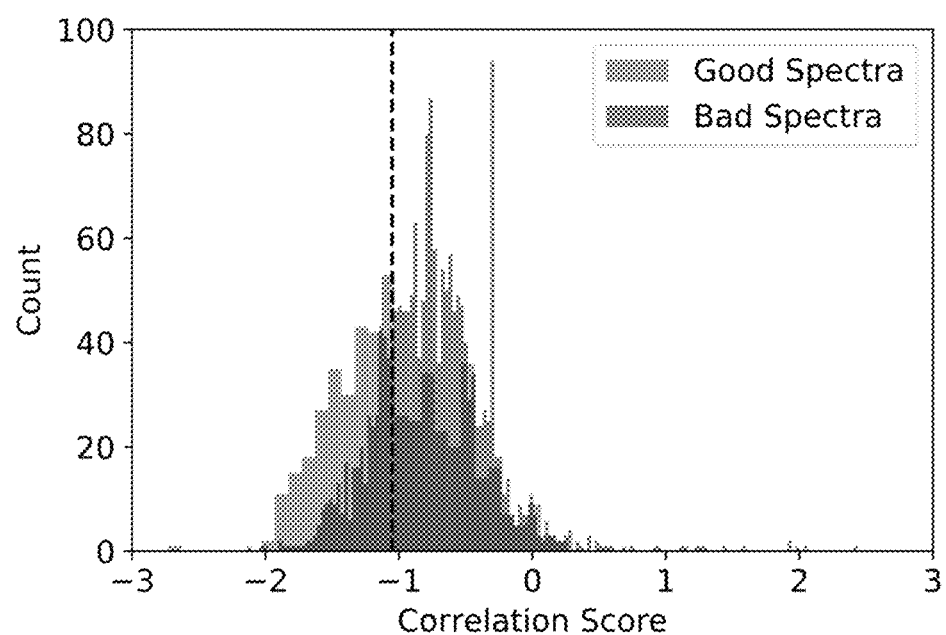
FIG. 8 is a distribution of correlation score of all spectra in our data set, according to an embodiment of the present invention.

Supporting Information for Automated Tip Conditioning for Scanning tunneling Spectroscopy, Correlation Method: FIG. 7 shows a 40 degrees polynomial fit curve of a good dI/dV spectrum, according to an embodiment of the present invention. FIG. 8 is a distribution of correlation score of all spectra in our data set, according to an embodiment of the present invention. The dashed line represents the threshold that generates the precision and recall scores in the main text. In order to benchmark the performance of our machine learning models, we applied a simple correlation method that doesn't rely on machine learning. We generated the polynomial fit curve (40 degrees) of a good dI/dV spectrum, shown in FIG. 7, and calculated the logarithm to the base 10 of the mean squared error of all the spectra in our dataset with respect to the fit curve as the correlation score. The distributions of the correlation scores of good (grade 2 to 4) and bad (grade 0 and 1) spectra are presented in FIG. 8. The threshold of the correlation score was set as −1.05 (dashed line in FIG. 8) to generate the precision and recall score presented in the main text.

Machine learning models: Stochastic gradient descent (SGD) regression was implemented using SGDClassifier from sklearn.linear_model with random state=42.

Support vector machine (SVM) classification was implemented using SVC from sklearn.svm with a degree 10 polynomial kernel and hyperparameters coef0=1 and C=100. Hyperparameters were optimized through three-fold cross-validation.

Logistic Regression was implemented using LogisticRegression from sklearn.linear_model with max_iter=1000.

Decision Tree classification was implemented using DecisionTreeClassifier from sklearn.tree with min_samples_leaf=5.

Random Forest classification was implemented using RandomForestClassifier from sklearn.ensemble with n_estimators=500 and min_samples_leaf=5.

AdaBoost classification was implemented using AdaBoostClassifier from sklearn.ensemble with a DecisionTreeClassifier (min_samples_leaf=5) as base classifier and n_estimators=1000, algorithm="SAMME.R". The learning rate was set as 0.5 for the model to converge.

CatBoost classification was implemented using CatBoostClassifier from catboost package with 1000 iterations.

Multilayer Perceptron (MLP) classification was implemented using Keras with TensorFlow backend. The neural network has 4 fully connected hidden layers with 300 neurons in the first hidden layer and 100 neurons each in the other three hidden layers. Rectified-linear-unit (ReLU) activation function was used for hidden layers. The output layer has 1 fully connected neuron with sigmoid activation function. The model was compiled with binary_crossentropy as the loss function and an SGD optimizer with learning rate 0.001 and momentum 0.9.

Convolutional Neural Network (CNN) classification was implemented using Keras with TensorFlow backend. The neural network consists of 2 1-dimentional convolutional layers with 20 filters for the first layer (kernel_size=7, strides=2, padding="same") and 40 filters for the second layer (kernel_size=3, strides=1, padding="same"). The second convolutional layer is followed by a max-pooling layer (kernel_size=2, strides=2) fully connected to a dense layer with 300 neurons, which in turn fully connected to a dense layer with 100 neurons. All hidden layers have ReLU activation function. The output layer has 1 fully connected neuron with sigmoid activation function. The model was compiled with binary_crossentropy as the loss function and an SGD optimizer with learning rate 0.001 and momentum 0.9.

Figure 9:
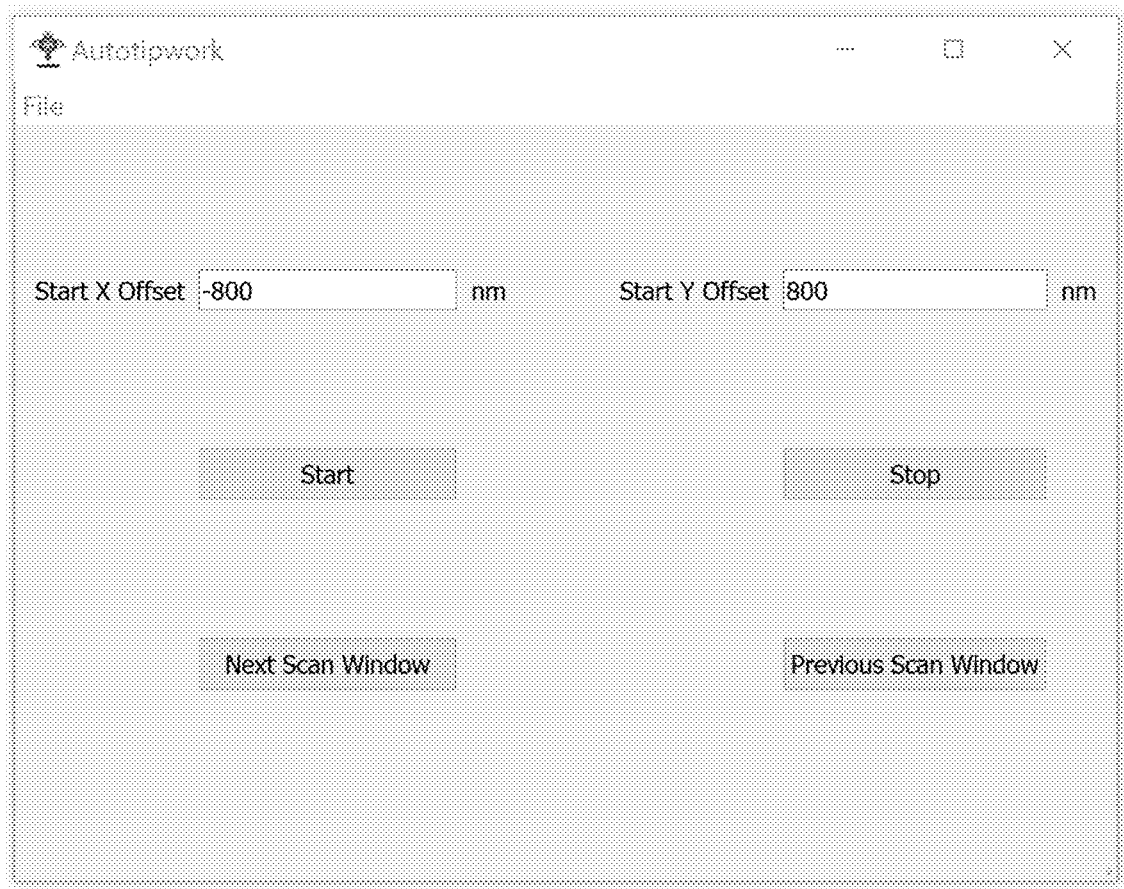
FIG. 9 shows a Graphical User Interface to facilitate interaction with the automated tip conditioning program implemented on a computer system, according to an embodiment of the present invention.

User Interface: FIG. 9 shows a Graphical User Interface to facilitate interaction with the automated tip conditioning program implemented on a computer system, according to an embodiment of the present invention. We designed a tentative user interface, shown in FIG. 9, to make the operation of our automated program easier. To run the program users can simply input the starting X and Y positions of the scan window and click the 'Start' button. The program will run by itself until a good STM tip is detected or the 'Stop' button is clicked by the user. The text in the 'Start X/Y Offset' textboxes will change as the program is running and will continue to represent the current positions of the scan window. The 'Next Scan Window' and 'Previous Scan Window' buttons will change the numbers in the 'Start X/Y Offset' textboxes to the positions of the next or previous scan window, respectively, in case users feel it easier to restart the program this way than to manually input the numbers.

Figure 10:
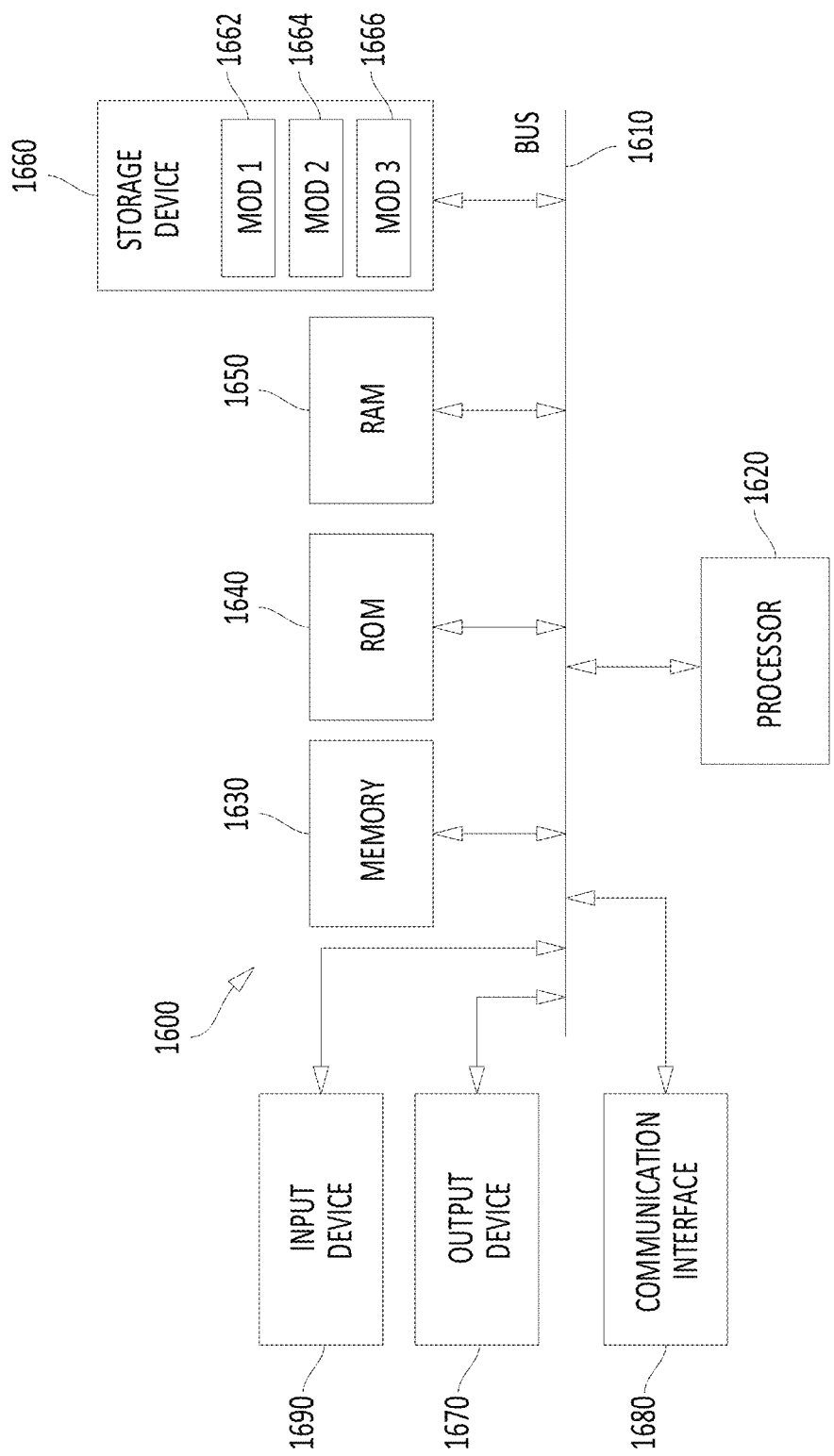
FIG. 10 is a schematic diagram of a computer system 1600 for implementing the programs or methods for automated tip conditioning for scanning tunneling spectroscopy, according to an embodiment of the present invention.

FIG. 10 is a schematic diagram of a computer system 1600 for implementing the programs or methods for automated tip conditioning for scanning tunneling spectroscopy, according to an embodiment of the present invention. With reference to FIG. 10, an exemplary computer system includes a general-purpose computing device 1600, including a processing unit (CPU or processor) 1620 and a system bus 1610 that couples various system components including the system memory 1630 such as read-only memory (ROM) 1640 and random-access memory (RAM) 1650 to the processor 1620. The computer system 1600 can include a cache of high-speed memory connected directly with, in close proximity to, or integrated as part of the processor 1620. The system 1600 copies data from the memory 1630 and/or the storage device 1660 to the cache for quick access by the processor 1620. In this way, the cache provides a performance boost that avoids processor 1620 delays while waiting for data. These and other modules can control or be configured to control the processor 1620 to perform various actions. Other system memory 1630 may be available for use as well. The memory 1630 can include multiple different types of memory with different performance characteristics. It can be appreciated that the disclosure may operate on a computing device 1600 with more than one processor 1620 or on a group or cluster of computing devices networked together to provide greater processing capability. The processor 1620 can include any general-purpose processor and a hardware module or software module, such as module 1 1662, module 2 1664, and module 3 1666 stored in storage device 1660, configured to control the processor 1620 as well as a special-purpose processor where software instructions are incorporated into the actual processor design. The processor 1620 may essentially be a completely self-contained computing system, containing multiple cores or processors, a bus, memory controller, cache, etc. A multi-core processor may be symmetric or asymmetric.

The system bus 1610 may be any of several types of bus structures including a memory bus or memory controller, a peripheral bus, and a local bus using any of a variety of bus architectures. A basic input/output (BIOS) stored in ROM 1640 or the like, may provide the basic routine that helps to transfer information between elements within the computing device 1600, such as during start-up. The computing device 1600 further includes storage devices 1660 such as a hard disk drive, a magnetic disk drive, an optical disk drive, tape drive or the like. The storage device 1660 can include software modules 1662, 1664, 1666 for controlling the processor 1620. Other hardware or software modules are contemplated. The storage device 1660 is connected to the system bus 1610 by a drive interface. The drives and the associated computer-readable storage media provide non-volatile storage of computer-readable instructions, data structures, program modules and other data for the computer system 1600. In one aspect, a hardware module that performs a particular function includes the software component stored in a tangible computer-readable storage medium in connection with the necessary hardware components, such as the processor 1620, bus 1610, display 1670, and so forth, to carry out the function. In another aspect, the system can use a processor and computer-readable storage medium to store instructions which, when executed by a processor (e.g., one or more processors), cause the processor to perform a method or other specific actions. The basic components and appropriate variations are contemplated depending on the type of device, such as whether the computer system 1600 is a small, handheld computing device, a desktop computer, or a computer server.

Although the exemplary embodiment described herein employs the hard disk 1660, other types of computer-readable media which can store data that are accessible by a computer, such as magnetic cassettes, flash memory cards, digital versatile disks, cartridges, random access memories (RAMs) 1650, and read-only memory (ROM) 1640, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computer system 1600, an input device 1690 represents any number of input mechanisms, such as a microphone for speech, a touch-sensitive screen for gesture or graphical input, keyboard, mouse, motion input, speech and so forth. An output device 1670 can also be one or more of a number of output mechanisms known to those of skill in the art. In some instances, multimodal systems enable a user to provide multiple types of input to communicate with the computer system 1600. The communications interface 1680 generally governs and manages the user input and system output. There is no restriction on operating on any particular hardware arrangement and therefore the basic features here may easily be substituted for improved hardware or firmware arrangements as they are developed.

The technology discussed herein refers to computer-based systems and actions taken by, and information sent to and from, computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

REFERENCES (1) Feenstra, R. M.; Stroscio, J. A.; Fein, A. P. Tunneling Spectroscopy of the Si(111)2×1 Surface. *Surf Sci.* 1987, 181, 295-306.

(2) Hamers, R. J. Atomic-Resolution Surface Spectroscopy with the Scanning Tunneling Microscope. *Annu. Rev. Phys. Chem.* 1989, 40, 531-559.

(3) Crommie, M. F.; Lutz, C. P.; Eigler, D. M. Confinement of Electrons to Quantum Corrals on a Metal Surface. *Science* 1993, 262, 218-220.

(4) Feenstra, R. M. Scanning tunneling spectroscopy. *Surf Sci.* 1994, 299-300, 965-979.

(5) Jamneala, T.; Madhavan, V.; Chen, W.; Crommie, M. F. Scanning tunneling spectroscopy of transition-metal impurities at the surface of gold. *Phys. Rev. B* 2000, 61, 9990-9993.

(6) Brar, V. W.; Zhang, Y.; Yayon, Y.; Ohta, T.; McChesney, J. L.; Bostwick, A.; Rotenberg, E.; Horn, K.; Crommie, M. F. Scanning tunneling spectroscopy of inhomogeneous electronic structure in monolayer and bilayer graphene on SiC. *Appl. Phys. Lett.* 2007, 91, 122102.

(7) Chen, Y.-C.; Cao, T.; Chen, C.; Pedramrazi, Z.; Haberer, D.; de Oteyza, D. G.; Fischer, F. R.; Louie, S. G.; Crommie, M. F. Molecular bandgap engineering of bottom-up synthesized graphene nanoribbon heterojunctions. *Nat. Nanotech.* 2015, 10, 156-160.

(8) Rizzo, D. J.; Veber, G.; Cao, T.; Bronner, C.; Chen, T.; Zhao, F.; Rodriguez, H.; Louie, S. G.; Crommie, M. F.; Fischer, F. R. Topological Band Engineering of Graphene Nanoribbons. *Nature* 2018, 560, 204-208.

(9) Mishra, S.; Beyer, D.; Eimre, K.; Kezilebieke, S.; Berger, R.; Gröning, O.; Pignedoli, C. A.; Müllen, K.; Liljeroth, P.; Ruffieux, P.; Feng, X.; Fasel, R. Topological frustration induces unconventional magnetism in a nanographene. *Nat. Nanotech.* 2020, 15, 22-28.

(10) Bartels, L.; Meyer, G.; Rieder, K.-H. Controlled vertical manipulation of single CO molecules with the scanning tunneling microscope: A route to chemical contrast. *Appl. Phys. Lett.* 1997, 71, 213-215.

(11) Gross, L.; Moll, N.; Mohn, F.; Curioni, A.; Meyer, G.; Hanke, F.; Persson, M. High-Resolution Molecular Orbital Imaging Using a p-Wave STM Tip. *Phys. Rev. Lett.* 2011, 107, 086101.

(12) Hapala, P.; Kichin, G.; Wagner, C.; Tautz, F. S.; Temirov, R.; Jelínek, P. Mechanism of high-resolution STM/AFM imaging with functionalized tips. *Phys. Rev. B* 2014, 90, 085421.

(13) Albrektsen, O.; Salemink, H. W. M.; Mo/rch, K. A.; Thölen, A. R. Reliable tip preparation for high-resolution scanning tunneling microscopy. *J. Vac. Sci. Technol.*, B 1994, 12, 3187-3190.

(14) Klein, M.; Schwitzgebel, G. An improved lamellae drop-off technique for sharp tip preparation in scanning tunneling microscopy. *Rev. Sci. Instrum.* 1997, 68, 3099-3103.

(15) Ernst, S.; Wirth, S.; Rams, M.; Dolocan, V.; Steglich, F. Tip preparation for usage in an ultra-low temperature UHV scanning tunneling microscope. *Sci. Technol. Adv. Mat.* 2007, 8, 347-351.

(16) Salmeron, M., Scanning Tunneling Microscopy. In *Characterization of Materials*, 2002.

(17) Binnig, G.; Rohrer, H.; Gerber, C.; Weibel, E. Surface Studies by Scanning Tunneling Microscopy. *Phys. Rev. Lett.* 1982, 49, 57-61.

(18) Hla, S.-W.; Braun, K.-F.; Iancu, V.; Deshpande, A. Single-Atom Extraction by Scanning Tunneling Microscope Tip Crash and Nanoscale Surface Engineering. *Nano Lett.* 2004, 4, 1997-2001.

(19) Rashidi, M.; Wolkow, R. A. Autonomous Scanning Probe Microscopy in Situ Tip Conditioning through Machine Learning. *ACS Nano* 2018, 12, 5185-5189.

(20) Chen, W.; Madhavan, V.; Jamneala, T.; Crommie, M. F. Scanning Tunneling Microscopy Observation of an Electronic Superlattice at the Surface of Clean Gold. *Phys. Rev. Lett.* 1998, 80, 1469-1472.

(21) Freund, Y.; Schapire, R. E. A Decision-Theoretic Generalization of On-Line Learning and an Application to Boosting. *J. Comput. Syst. Sci.* 1997, 55, 119-139.

(22) Dorogush, A. V.; Ershov, V.; Gulin, A. CatBoost: gradient boosting with categorical features support. arXiv:1810.11363 2018.

(23) Woolley, R. A. J.; Stirling, J.; Radocea, A.; Krasnogor, N.; Moriarty, P. Automated probe microscopy via evolutionary optimization at the atomic scale. *Appl. Phys. Lett.* 2011, 98, 253104.

(24) Stirling, J.; Woolley, R. A. J.; Moriarty, P. Scanning probe image wizard: A toolbox for automated scanning probe microscopy data analysis. *Rev. Sci. Instrum.* 2013, 84, 113701.

(25) Møller, M.; Jarvis, S. P.; Guérinet, L.; Sharp, P.; Woolley, R.; Rahe, P.; Moriarty, P. Automated extraction of single H atoms with STM: tip state dependency. *Nanotechnology* 2017, 28, 075302.

(26) Ziatdinov, M.; Maksov, A.; Kalinin, S. V. Learning surface molecular structures via machine vision. NPJ Comput. Mater. 2017, 3, 31.

(27) Gordon, O. M.; Junqueira, F. L. Q.; Moriarty, P. J. Embedding human heuristics in machine-learning-enabled probe microscopy. Machine Learning: *Science and Technology* 2020, 1, 015001.

(28) Gordon, O.; Moriarty, P. Machine learning at the (sub)atomic scale: next generation scanning probe microscopy. *Machine Learning: Science and Technology* 2020, ASAP.

(29) Pedregosa, F.; Varoquaux, G.; Gramfort, A.; Michel, V.; Thirion, B.; Grisel, O.; Blondel, M.; Prettenhofer, P.; Weiss, R.; Dubourg, V.; Vanderplas, J.; Passos, A.; Cournapeau, D.; Brucher, M.; Perrot, M.; Duchesnay, É. Scikit-learn: Machine Learning in Python. *J. Mach. Learn. Res.* 2011, 12, 2825-2830.

While various embodiments of the present invention have been described above, it should be understood that they have been presented by way of example only, and not limitation. Thus, the breadth and scope of the present invention should not be limited by any of the above-described illustrative embodiments, or following examples, but should instead be defined only in accordance with the following claims and their equivalents.

The embodiments illustrated and discussed in this specification are intended only to teach those skilled in the art how to make and use the invention. In describing embodiments of the disclosure, specific terminology is employed for the sake of clarity. However, the disclosure is not intended to be limited to the specific terminology so selected. The above-described embodiments, and following examples, may be modified or varied, without departing from the invention, as appreciated by those skilled in the art in light of the above teachings. It is therefore to be understood that, within the scope of the claims and their equivalents, the invention may be practiced otherwise than as specifically described. For example, it is to be understood that the present disclosure contemplates that, to the extent possible, one or more features of any embodiment can be combined with one or more features of any other embodiment.

We claim:

1. A scanning tunneling microscope, comprising:
a z-axis scanning assembly;
a quantum tunneling tip operatively connected to said z-axis scanning assembly;
a z-axis controller configured to communicate with said z-axis scanning assembly;
an x-y scanning assembly comprising a sample platform having a surface for holding a sample to be observed and arranged proximate said quantum tunneling tip separated in a z-axis direction from said surface;
an x-y controller configured to communicate with said x-y scanning assembly;
a measurement circuit connected to said quantum tunneling tip and said sample platform such that a relative electrical voltage between said quantum tunneling tip and said sample platform can be provided during operation and such that an electrical current due to quantum mechanical tunneling from a sample held on said sample platform and said quantum tunneling tip can be measure, said measurement circuit being in communication with said z-axis controller to provide measurements of said electrical current; and
a data processor configured to communicate with said z-axis controller and said x-y controller to receive one of surface imaging information or point spectral information therefrom,
wherein said data processor is further configured to provide instructions to said z-axis controller and said x-y controller for automatic conditioning of said quantum tunneling tip.

2. The scanning tunneling microscope according to claim 1, wherein said data processor is further configured to automatically locate a conditioning region within a scanning tunneling surface map for quantum tunneling tip conditioning.

3. The scanning tunneling microscope according to claim 2, wherein said data processor is further configured to automatically provide instructions to said x-y controller to position said quantum tunneling tip over said conditioning region, to automatically provide instructions to said z-axis controller to move said quantum tunneling tip to come into contact and then retract from contact with said conditioning region, to automatically provide instructions to said x-y controller to re-position said quantum tunneling tip over said conditioning region, to provide instructions to said z-axis controller to perform scanning tunneling spectroscopy measurements, and to compare said scanning tunneling spectroscopy measurements to a model to determine whether said quantum tunneling tip is in condition for use.

4. The scanning tunneling microscope according to claim 3, wherein said data processor is further configured to automatically repeat providing instructions to said x-y controller to position said quantum tunneling tip over said conditioning region, to automatically repeat providing instructions to said z-axis controller to move said quantum tunneling tip to come into contact and then retract from contact with said conditioning region, to automatically repeat providing instructions to said x-y controller to re-position said quantum tunneling tip over said conditioning region, to automatically repeat providing instructions to said z-axis controller to perform scanning tunneling spectroscopy measurements, and to automatically repeat comparing said scanning tunneling spectroscopy measurements to a model until it automatically determines that said quantum tunneling tip is in condition for use.

5. The scanning tunneling microscope according to claim 3 or 4, wherein said model is a machine learning model resulting from training on a plurality of data sets.

6. A method for automated tip conditioning for a scanning tunneling microscope, comprising:
- receiving by a computer one of surface imaging information or point spectral information from a quantum tunneling tip;
- locating by the computer a conditioning region within a scanning tunneling surface map for quantum tunneling tip conditioning;
- providing instructions by the computer to position said quantum tunneling tip over said conditioning region;
- providing instructions by the computer to move said quantum tunneling tip to come into contact and then retract from contact with said conditioning region;
- providing instructions by the computer to re-position said quantum tunneling tip over said conditioning region;
- providing instructions by the computer to perform scanning tunneling spectroscopy measurements; and
- providing instructions by the computer to compare said scanning tunneling spectroscopy measurements to a model to determine whether said quantum tunneling tip is in condition for use.

7. The method of claim 6, further comprising repeating a plurality of times until a stopping criterion is met at least the following:
- providing instructions by the computer to position said quantum tunneling tip over said conditioning region;
- providing instructions by the computer to move said quantum tunneling tip to come into contact and then retract from contact with said conditioning region;
- providing instructions by the computer to re-position said quantum tunneling tip over said conditioning region;
- providing instructions by the computer to perform scanning tunneling spectroscopy measurements; and
- providing instructions by the computer to compare said scanning tunneling spectroscopy measurements to a model to determine whether said quantum tunneling tip is in condition for use.

8. The method of claim 6 or claim 7, wherein said model is a machine learning model resulting from training on a plurality of data sets.

9. A non-transitory computer-readable medium storing a computer-executable code which when executed by a computer system causes the computer system to perform the method of claim 8.

10. A non-transitory computer-readable medium storing a computer-executable code which when executed by a computer system causes the computer system to perform the method of claim 6 or claim 7.

11. A computer-implemented method for automated tip conditioning for a scanning tunneling microscope, wherein the method is implemented in a computer system comprising one or more processors configured to execute one or more computer program modules, the method comprising:
- receiving by the computer system one of surface imaging information or point spectral information from a quantum tunneling tip;
- locating by the computer system a conditioning region within a scanning tunneling surface map for quantum tunneling tip conditioning;
- providing instructions by the computer system to position said quantum tunneling tip over said conditioning region;
- providing instructions by the computer system to move said quantum tunneling tip to come into contact and then retract from contact with said conditioning region;
- providing instructions by the computer to re-position said quantum tunneling tip over said conditioning region;
- providing instructions by the computer system to perform scanning tunneling spectroscopy measurements; and
- providing instructions by the computer system to compare said scanning tunneling spectroscopy measurements to a model to determine whether said quantum tunneling tip is in condition for use.

* * * * *